J. STURROCK.
GRAIN DRILL.
APPLICATION FILED OCT. 24, 1913.
1,226,721. Patented May 22, 1917.
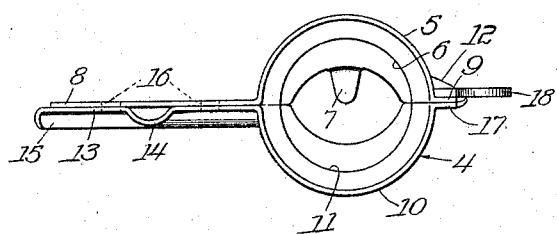
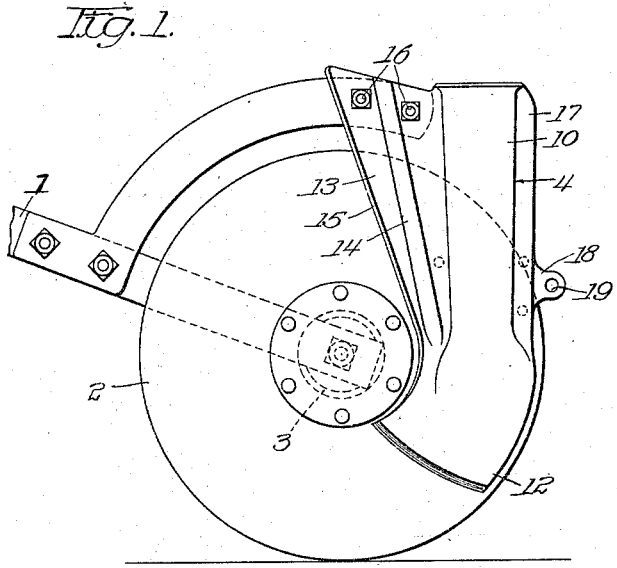
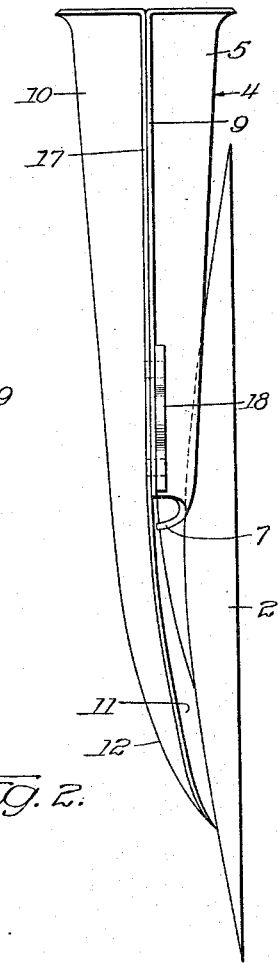
Witnesses:
F.W. Hoffmeister
E.W. Burgess
Inventor:
John Sturrock.
by Chas. E. Lord
Atty.

UNITED STATES PATENT OFFICE.

JOHN STURROCK, OF CHICAGO, ILLINOIS, ASSIGNOR TO INTERNATIONAL HARVESTER COMPANY OF NEW JERSEY, A CORPORATION OF NEW JERSEY.

GRAIN-DRILL.

1,226,721.      Specification of Letters Patent.      Patented May 22, 1917.

Application filed October 24, 1913. Serial No. 797,045.

*To all whom it may concern:*

Be it known that I, JOHN STURROCK, a subject of the King of Great Britain, residing at Chicago, in the county of Cook and State of Illinois, have invented certain new and useful Improvements in Grain-Drills, of which the following is a full, clear, and exact specification.

My invention relates to grain drills, and in particular to an improved form of seed distributing boot, preferably made from sheet metal, and having seed deflecting means operative to discharge the seed against the wall of the lower end of the boot, away from the disk, rotatable adjacent the boot. The object of the invention is to provide a boot that is light, strong and durable, efficient in operation and cheaply constructed. These objects are attained by means of mechanism, one embodiment of which is illustrated in the accompanying drawings, in which—

Figure 1 is a side elevation of a seed distributing boot for grain drills having my invention embodied in its construction;

Fig. 2 is a rear view of Fig. 1; and

Fig. 3 is a top view of the boot.

Referring to the drawings, in which the same reference characters designate like parts throughout the several views, 1 represents the usual drag bar, 2 a furrow opening disk having a concavo-convex form and journaled upon a bearing 3 carried by the drag bar, these parts being common in this class of machines. 4 represents the seed delivery boot, having a tubular form and including two separately formed members stamped from sheet metal and rigidly connected together, preferably by integrally uniting the same by means of spot-welding, as indicated by the dotted circles in the drawing. The member 5, adjacent the disk 2, is provided with a semi-circular longitudinally disposed depression 6, having a gradually reduced depth from its upper to its lower end that terminates in an inturned lip 7 at its lower end, and having a strengthening rib member 8 at its front side that tapers inward and downward in rear of the axis of the furrow opening disk, a strengthening rib 9 at its rear side disposed parallel with the depressed portion and extending downward to a point substantially in the same horizontal plane with the juncture of the lip 7 with the body of the depression 6. 10 represents the opposite side of the boot 4, that is provided with a longitudinally disposed portion 11 corresponding in form with that of the depression 6 in member 5 and terminating in a lower extended portion 12, that is curved forward at its front and rear sides substantially concentric with the axis of the disk 2 and having a greater width than the lower end of member 5, and conforming with the adjacent convex surface of the disk; the lower end of member 10 being curved forward and upward and fitting closely against the disk in a manner to form a scraper therefor, the seed being directed by the forward portion of the closely fitting wall member 10 toward the widened lower part of the depression 11, that turns rearward, and flowing from the lower end of the depression downward and rearward against the disk 2, reaches the furrow through the space between the lower rear side of member 10 and the disk. The member 10 is also provided with a forwardly extending and downwardly and rearwardly tapering rib member 13 that terminates at the upper end of the curved front part of the portion 12 and is provided with a longitudinally depressed strengthening rib portion 14 at its middle part that terminates at the upper end of the widened part 12; the front side of the rib being turned outward, forming a supplemental strengthening rib 15, as shown in Fig. 3. 16 represets transversely disposed openings at the upper end of the rib members 8 and 13, whereby the boot is secured to the drag bar 1, and 17 a rearwardly extending rib member corresponding with rib 9, and terminating at its lower end at the upper part of the curved rear side of the widened part 12. 18 represents an ear member secured to the lower ends of rib members 9 and 17, and provided with a transverse opening 19 whereby a trailing seed covering device may be connected with the boot. The two members of the boot may be secured together by means of rivets, spot-welding or otherwise, as preferred.

In the operation of the device the seed is delivered to the boot by means of any of the common forms of flexible tubes, and as it flows therefrom it is directed toward the widened depression in the part 12, that is so formed that in coöperation with the adjacent moving wall of the disk furrow opener, the seed is arranged in line with the furrow and turned rearward and delivered to the furrow in an evenly distributed manner in the direction of the line of draft of the machine. The lip 7 will act to limit the extent of telescopic movement of the delivery tube within the boot when the disk is in raised position, and will aid also in the inward deflection of the grain to insure its delivery against the inner face of the lower widened portion 12 and prevent premature contact thereof with the moving disk. The forward lower edge of the member 10, as has been noted, is curved inwardly to fit closely against the side of the disk, and in effect forms a trough to direct the course of the grain after it leaves the closed portion of the boot and cause it to be deflected in the proper direction between the member 12 and the disk.

I have shown and described one form of my invention, but it is understood that I do not wish to confine it to the precise details of construction as shown, as many minor changes may be made without departing from the spirit of the invention.

What I claim as my invention, and desire to secure by Letters Patent, is:

1. In combination, a disk furrow opener and a pressed sheet metal seed delivery boot comprising two separately formed integrally united members having registering depressed grain delivery portions therein, the inner member terminating intermediate the ends of the other and having a curved portion to direct the grain against the surface of the outer member, and the outer member in co-action with the convex surface of the disk forming the lower end of the delivery portion to discharge the seed rearwardly.

2. A pressed sheet metal seed delivery boot for grain drills comprising two separately formed members having corresponding longitudinally disposed depressed portions, one of said members being of greater length than the other and having the depression therein terminating in a widened portion at its lower end having a downwardly and rearwardly extending scraping surface, the shorter member having its lower end inwardly curved to direct the grain against the lower end of the longer member.

3. In a seed delivery boot for grain drills, in combination, a rotatable furrow opening disk, two separately formed boot members having corresponding longitudinally disposed semi-circular depressed portions, one of said members being of greater length than the other and terminating gradually into a widened portion at its lower end that engages with said disk and is disposed between the axis and periphery thereof, the shorter member being tapered inwardly to deflect the seed against the lower end of the longer member.

4. In a seed delivery boot for grain drills, in combination, a rotatable furrow opening disk, two separately formed boot members having corresponding longitudinally disposed semi-circular depressed portions, one of said members being of greater length than the other and terminating in a portion disposed between the axis and periphery of the disk and having the front and rear sides thereof substantially concentric to the axis of said disk and the lower end conforming to the adjacent surface of the disk and forming a scraper for said disk.

5. In a seed delivery boot for grain drills, in combination, a drag bar, a rotatable furrow opening disk journaled thereon, two separately formed boot members carried on said drag bar at the convex side of the disk having corresponding longitudinally disposed semi-circular depressed portions terminating at a point between the axis and periphery of the disk, one of said members being of greater length than the other and the shorter member being upon that side adjacent said disk and tapered inwardly to deflect the seed against the lower end of the longer member.

6. In a seed delivery boot for grain drills, in combination, a concavo-convex rotatable furrow opening disk, a seed boot comprising two separately formed members having corresponding longitudinally disposed semi-circular depressed portions that are gradually reduced in depth from their upper toward their lower ends, one of said members being of greater length than the other, the shorter member being upon that side adjacent the convex surface of said disk and provided with an inwardly curved member at its lower end.

7. The combination of a pressed sheet metal seed delivery boot for grain drills, comprising two separately formed boot members having corresponding longitudinally disposed semi-circular depressed portions, one of said members being of greater length than the other, said members having forwardly extending strengthening rib members that are tapered inward toward the lower end of said depressed portion, one of said rib members having a longitudinally disposed strengthening depressed rib member formed thereon, and a drag bar connected to the upper end of the forwardly extending strengthening rib members.

8. In a seed delivery boot for grain drills, in combination, two separately formed sheet metal boot members having corresponding longitudinally disposed semi-circular depressed portions forming, when the parts are assembled, a grain delivery tube, one of said members being of greater length than the other, said members having rearwardly extending strengthening rib members disposed parallel with the depressed portion, and forwardly extending rib members tapering downward and inward, the longer member being provided with a longitudinally disposed strengthening rib member formed upon its body portion and an outwardly curved rib member at the forward edge thereof.

9. In a seed delivery boot for grain drills, in combination, two separately formed sheet metal boot members having corresponding longitudinally disposed semi-circular depressed portions forming, when the parts are assembled, a grain delivery tube, one of said members being of greater length than the other, said longer member having an upwardly and forwardly curved portion at its lower end operative as a disk scraper, and a forwardly extending rib member tapering downward and inward toward the lower end, the tapered portion of said rib member having a longitudinally disposed strengthening member formed upon its body portion and an outwardly curved lip member at the front edge thereof.

10. In a grain drill, in combination, a concavo-convex rotatable furrow opening disk, a seed delivery boot carried adjacent said disk and having the lower part of its body portion conforming with the convex surface of said disk, the lower edge thereof curving forward and upward toward the axis of said disk and operative as a scraper for said disk, the front and rear sides of the lower end of the body portion being formed substantially concentric with the axis of said disk and being disposed between the axis and periphery thereof.

11. In a grain drill, a drag bar, a concavo-convex disk journaled thereon, and a grain boot attached to said drag bar extending downwardly therefrom between the axis and periphery of said disk and on the convex side thereof, having its side member removed from the disk longer than the side member adjacent the disk and the lower end of said outer side member inclined inward and provided with a rear outlet, the shorter side member having its lower end inwardly curved to direct the grain against the surface of the longer side member.

12. In a grain drill, a drag bar, a concavo-convex rotatable furrow opening disk journaled thereon, and a grain boot attached to said drag bar and extending downward between the axis and periphery of said disk and on the convex side thereof having one of its side members longer than the other and curved concentric with the axis of the disk and its lower edge conforming to the convex surface of the disk and engageable therewith.

13. In a disk furrow opener, a support, a disk rotatably mounted thereon, a boot secured to said support at the convex side of said disk and having one of its sides terminating at a point above the cutting edge of said disk and extending upwardly and forwardly from said point in engagement with the convex surface of the disk, the opposite side of said boot being shorter than the side mentioned and curved inwardly to deflect the grain and deliver the grain between the lower end of the first mentioned side and the convex surface of the disk.

14. In a disk furrow opener, a support, a disk rotatably mounted upon said support, a boot secured to said support at the side of said disk, the lower end of said boot terminating at a point above the cutting edge of said disk and having the lower end cut away at the rear and on the inner side, the outer side of said boot extending below the inner side and also extending rearwardly and having its forward and lower edges bent inwardly in close proximity to the side of said disk thereby forming a shield.

15. In a disk furrow opener, a support, a disk rotatably mounted upon said support, a boot secured to said support at the side of said disk, the lower end of said boot terminating at a point above the cutting edge of said disk and being cut away at the rear and also on the sides and extended below said boot to a point in close proximity to the cutting edge of the disk and also being bent so as to cause its forward and lower edges to lie in close proximity to the side of the disk, the forward wall of said boot being extended and formed of a trough shape, substantially as and for the purpose described.

16. In a disk furrow opener, a support, an angularly arranged concavo-convex disk rotatably mounted upon said support, a boot secured to said support at the side of said disk, said boot being converged or narrowed toward the point of discharge with its lower end curved inwardly so as to lie in close proximity to the convex side of the disk, the lower end of said boot terminating at a point above the cutting edge of said disk and being cut away at the rear and at both sides, the outer side of said boot being projected to a point in close proximity to the cutting edge of said disk and having its lower and forward edges inwardly in close proximity to the convex side of said disk, the forward wall of said boot at the extreme lower end thereof being formed of a trough shape, substantially as and for the purpose specified.

In testimony whereof I affix my signature, in the presence of two witnesses.

JOHN STURROCK.

Witnesses:
R. B. ANDERSON,
C. C. BURNS.